Aug. 17, 1937.  F. G. ALBORN  2,090,175
INTERNAL COMBUSTION ENGINE
Filed July 20, 1934
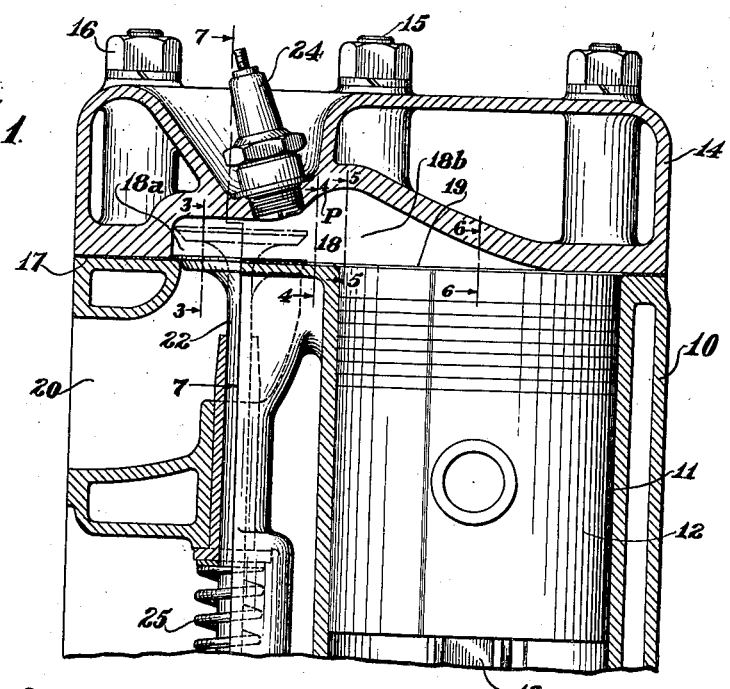
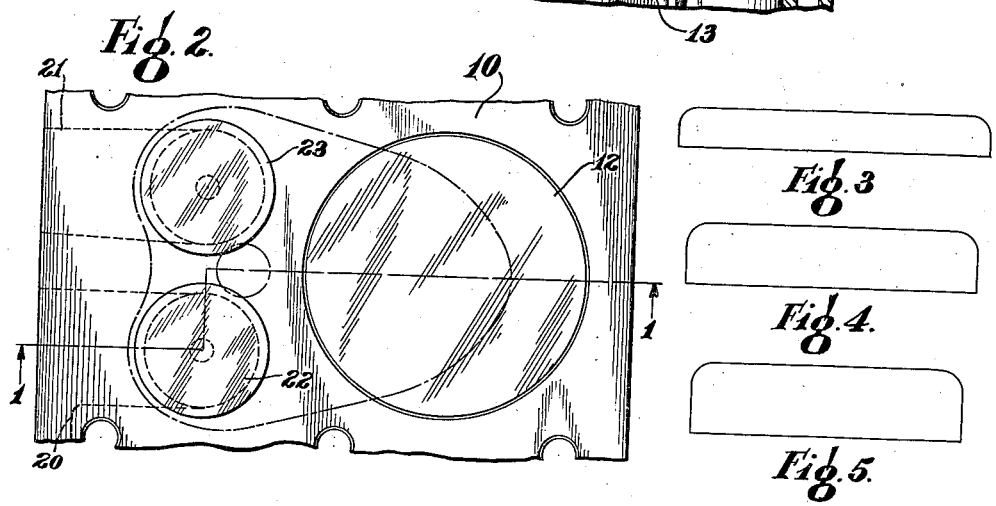
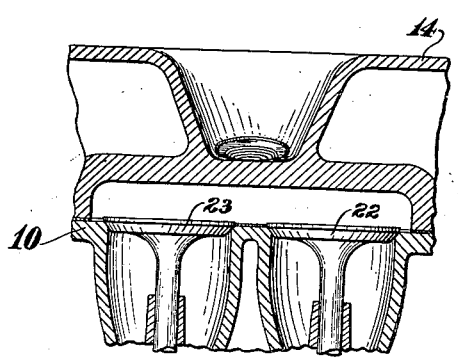
INVENTOR.
Frank G. Alborn.
BY
RM Cooper
ATTORNEY.

Patented Aug. 17, 1937

2,090,175

UNITED STATES PATENT OFFICE 2,090,175

INTERNAL COMBUSTION ENGINE

Frank G. Alborn, Cleveland, Ohio, assignor to The White Motor Company, Cleveland, Ohio, a corporation of Ohio Application July 20, 1934, Serial No. 736,154

4 Claims. (Cl. 123—191)

This invention relates to internal combustion engines, and has for its object the provision of an improved construction for internal combustion engines of the high compression type.

The invention contemplates an engine construction embodying a novel combination of features which act to control detonation and to provide for free flow between the combustion chambers and cylinders of the fuel mixture and gases of combustion.

A salient feature of the invention resides in the construction of the combustion chamber in such a manner that the outer wall of the combustion chamber is located a much shorter distance from the edge of the valves than in conventional practice.

In accordance with conventional engine design, it has heretofore been the practice to space the outer wall of the combustion chamber a substantial distance from the edge of the valves, the idea being that the flow of mixture into the combustion chamber and the flow of the gases out of the combustion chamber would otherwise be restricted. I have found that in a construction of the type hereafter disclosed that the flow of mixture into the combustion chamber and the flow of the gases of combustion out of the combustion chamber is not restricted by placing the outer wall close to the valves, and in the embodiment of the invention illustrated in the accompanying drawing the outer wall of the combustion chamber is located as close to the valves as mechanical limitations will permit. The advantage of this feature is that it permits the extension of the combustion chamber away from the cylinder to be shortened with the attainment of a more compact combustion chamber.

A second salient feature of the invention resides in the shape of the combustion chamber which is constructed with a shallow valve pocket and with a roof curved upward in extension over the edge of the cylinder providing for free flow between the valve pocket and the cylinder of the fuel mixture and the gases of combustion with a gradual change in direction. By providing for free flow with a gradual change in the direction of flow as above set forth, a saving of energy is effected in the transfer back and forth between the valve pocket and cylinder of the fuel mixture and the gases of combustion with a resultant gain in power output.

A further feature of the invention resides in the proper location of the spark plug.

A fourth important feature of the invention resides in making a portion of the cylinder in a manner to facilitate the attainment of a compact combustion chamber.

Referring to the drawing which illustrates a practical embodiment of the invention:

Figure 1 is a fragmentary sectional view of a four-cycle gasoline engine, the sections being taken on a combination of planes as illustrated in Figure 2 by the line 1—1.

Figure 2 is a fragmentary top plan view of the cylinder block of the engine, the outlines of the combustion chamber and spark plug being shown in dot and dash line.

Figures 3, 4, 5 and 6 are diagrammatic sectional views of the combustion chamber of the engine taken successively on lines 3—3, 4—4, 5—5 and 6—6 of Figure 1, and Figure 7 is a fragmentary sectional view of the engine, the sections being taken on a combination of planes indicated by the line 7—7 of Figure 1.

Referring to the drawing, the numeral 10 indicates the cylinder block of the engine therein illustrated. Mounted within the cylinder 11 of the block 10 there is a conventional type piston 12 operatively connected by means of a connecting rod 13 to a crankshaft, not shown, journalled in the lower portion of the engine. The upper end of the cylinder block is closed by a cylinder head 14 secured in place by means of studs 15 equipped with nuts 16; and compressed between the cylinder head 14 and the cylinder block 10, there is a cylinder head gasket 17.

The cylinder head 14 is formed with a compression chamber 18 communicating with the cylinder through an opening 19 of less area than the cylinder. The top of the cylinder is closed by the lower wall of the cylinder head except for the opening 19; and the piston, crankshaft, and connecting rod assembly is so arranged that only a small clearance space having the depth of the compressed gasket 17 exists between such wall and the top of the piston when the piston is at the end of its compression stroke. Leading into the compression chamber 18 through the cylinder block 10, there is an exhaust passage 20 and an inlet passage 21 controlled by poppet valves 22 and 23 respectively; and mounted in the roof of the combustion chamber superadjacent the outer edges of the valves 22 and 23, there is a spark plug 24. The valves 22 and 23 are equipped with closing springs 25 and are arranged to be operated by a camshaft, not shown, in the conventional manner. The spark plug 24 is connected to electrical means of conventional construction designed to produce electrical disharges between the electrodes of the plug at proper intervals in the operation of the engine.

The compression chamber 18 comprises a shallow valve pocket 18a having a depth slightly greater than the lift of the valves and constructed in such a manner that its outer wall occupies a position as close to the valves as mechanical limitations will permit. The valve pocket 18a communicates with the cylinder through a chamber 18b constructed with a roof curved upward at P in extension over the edge of the cylinder and inclined downward within the outline of the cylinder to meet the lower surface of the cylinder head.

By constructing a combustion chamber in the manner described, a compact combustion chamber providing for free flow between it and the associated cylinder of the fuel mixture and the gases of combustion with a gradual change in direction is attained, and one which has been found in practice to give improved results over high compression chambers of conventional design.

The operation of the engine is in general similar to that of a conventional four-cycle gasoline engine, and will readily be understood by those skilled in the art.

Although the foregoing description is necessarily of a detailed character, in order that the invention may be completely set forth, it is to be understood that the specific terminology is not intended to be restrictive or confining, and that various rearrangements of parts and structural details may be resorted to without departing from the scope or spirit of the invention as herein claimed.

I claim as my invention:

1. In an internal combustion engine, a cylinder block with a cylinder-bore therein, a piston in said cylinder-bore, a cylinder head formed with a combustion chamber communicating with one end of said cylinder-bore through an opening of less area than said cylinder-bore and with a wall surface closing said cylinder-bore at the combustion chamber end except for the aforesaid opening, said combustion chamber being provided at one side of said cylinder-bore with an inlet port and with an exhaust port, valves for controlling said inlet and exhaust ports, said combustion chamber comprising a shallow valve pocket, and a portion forming a communicating passage between said valve pocket and said cylinder constructed with a first wall member curved outward from the plane of separation between said cylinder block and said cylinder head in extension over the edge of said cylinder-bore, and a second wall member inclined inward toward the aforesaid plane within the extended outline of said cylinder-bore to meet the aforesaid surface of said cylinder head, said valve pocket having an end wall member, and an ignition device located at the junction of said end wall member and said first outwardly curved wall member.

2. In an internal combustion engine, a cylinder block with a cylinder-bore therein, a cylinder head formed with a combustion chamber communicating with one end of said cylinder-bore through an opening of less area than said cylinder-bore, and with a wall surface closing said cylinder-bore at the combustion chamber end except for the aforesaid opening, inlet and exhaust ports formed in said cylinder block and communicating with said combustion chamber at one side of said cylinder-bore, valves for controlling said inlet and exhaust ports, said combustion chamber comprising a portion forming a communicating passage between said valve ports and said cylinder-bore, said passage being constructed with a first wall member curved outward from the plane of separation between said cylinder block and said cylinder head, and a second wall member inclined inward toward the aforesaid plane within the extended outline of said cylinder-bore toward said cylinder head surface and an ignition device located outwardly beyond said valves.

3. In an internal combustion engine, a cylinder block formed with a cylinder-bore, a cylinder head forming a combustion chamber in conjunction with said block, one end of said combustion chamber communicating with one end of said cylinder-bore, the contour of said combustion chamber as shown on a vertical section being so contrived that communication between said chamber and cylinder-bore in a direction substantially perpendicular to the axis of said cylinder-bore is through an opening of less area than that of the cylinder-bore, and that the cylinder head wall which is appositioned to the cylinder block comprises a section which extends in a direction away from the plane of separation between said cylinder block and said cylinder head, and another section which extends in a direction toward the aforementioned plane of separation, inlet and exhaust ports formed in said cylinder block and communicating with said combustion chamber, valves for controlling said ports and ignition means carried by said cylinder head.

4. In an internal combustion engine, a cylinder block formed with a cylinder-bore, a cylinder head forming a combustion chamber in conjunction with said block, one end of said combustion chamber communicating with one end of said cylinder-bore, the contour of said combustion chamber as shown on a vertical section being so contrived that communication between said chamber and bore in a direction substantially perpendicular to the axis of said cylinder-bore is through an opening of less area than that of the cylinder-bore, and that an intermediate portion of the cylinder head wall which is appositioned to the cylinder block comprises a section remote from said cylinder-bore axis which is curved outward from the plane of separation between said cylinder block and said cylinder head to a point approximately over one side of said cylinder-bore, and another merging section nearer the cylinder-bore axis which is inclined inward toward the aforementioned plane of separation within the outline of said cylinder-bore, inlet and exhaust ports formed in said cylinder block and communicating with said combustion chamber at one side of said cylinder-bore, valves for controlling said ports and ignition means carried by said cylinder head at one margin of said outwardly curved section of the said cylinder head wall.

FRANK G. ALBORN.